United States Patent [19]

Pshtissky

[11] Patent Number: 4,714,959
[45] Date of Patent: Dec. 22, 1987

[54] BI-DIRECTIONAL AMPLIFIER FOR CONTROL AND VIDEO SIGNALS IN A CLOSED CIRCUIT TELEVISION SYSTEM

[75] Inventor: Yacov A. Pshtissky, Bayside, N.Y.
[73] Assignee: Vicon Industries, Inc., Melville, N.Y.
[21] Appl. No.: 888,767
[22] Filed: Jul. 22, 1986
[51] Int. Cl.$^4$ .................. H04N 1/00; H04N 5/14; H04N 5/228; H04N 5/222
[52] U.S. Cl. ........................... 358/184; 358/86; 358/210; 358/185
[58] Field of Search ............... 358/184, 185, 105, 107, 358/108, 86, 210

[56] References Cited

U.S. PATENT DOCUMENTS

| | | | |
|---|---|---|---|
| 3,215,774 | 11/1965 | Ikegami | 358/210 |
| 4,300,168 | 11/1981 | Kawamura | 358/210 |
| 4,318,131 | 3/1982 | Okuhara et al. | 358/210 |
| 4,490,742 | 12/1984 | Wurtzinger | 358/108 |

Primary Examiner—Howard W. Britton
Assistant Examiner—John K. Peng
Attorney, Agent, or Firm—Darby & Darby

[57] ABSTRACT

A bi-directional amplifier for use in closed circuit television systems. The bi-directional amplifier permits the amplification of video signals received from a remote camera and camera control signals received from a control panel. The control signals and video signals are placed on opposite ends of a single link conductor such as a coaxial cable or twisted pair connecting the console and camera. The control signals are transmitted during the vertical back porch period of the video signal. The bi-directional amplifier can be placed in the middle of long runs of the single link to permit balanced or unbalanced transmissions of closed circuit television signals and accompanying control signals over lengths of cable which ordinarily require amplification of the signals to compensate for signal attenuation.

18 Claims, 7 Drawing Figures

BI-DIRECTIONAL AMPLIFIER FOR CONTROL AND VIDEO SIGNALS IN A CLOSED CIRCUIT TELEVISION SYSTEM

BACKGROUND OF THE INVENTION

1. Field of the Invention

This invention pertains to the field of closed circuit television (CCTV) and more particularly to a device for permitting two-way transmission of video information and control signals over a single conductive link such as coaxial cable or twisted wire pair.

2. Description of the Prior Art

Closed circuit television systems ordinarily include a control or console panel and monitor mounted remote from a television camera from which a television picture is received. Remote control of the camera is achieved via camera control devices such as lens focus, iris, zoom, and camera attitude (pan and tilt) mechanisms mounted on the camera. These mechanisms, may include a motor mechanically coupled to the lens to vary, in the case of the focus control, for example, the focus of the lens. It is desireable to accomplish control of such mechanisms from the control console to allow a person watching the monitor, referred to herein as the operator, to control the camera. This permits the operator to select the area he wishes to observe. This ability is particularly important in security type installations, since it gives the operator the capability to view selected areas in which security related problems may be occurring.

In most CCTV installations, separate cables are run between the camera and the control console to carry the video signal from the camera to the control console, and to carry the various camera control signals from the control console to the camera. Typically, a five conductor cable carries the focus, zoom and iris control signals, and an eight conductor cable carries the pan and tilt control signals between the camera and control room for complete control over the camera's field of view. Additionally, another cable such as a coaxial cable or twisted pair, hereinafter referred to as a single link, is needed to carry the television video signal.

Such closed circuit installations can be expensive when the control console is located more than a short distance from the camera, due to the labor necessary to install numerous cables as well as the cost of the cables themselves. The cost for wire alone can be very high when long cable runs, for example, in the order of a mile, are needed.

Systems are known in the art in which a single link, such as a coaxial cable, carries both the control signals from the control console and the video signals from the camera. In these single link systems a receiver which is mounted near the camera, receives the camera control signals generated at the control room console and decodes and couples them to the various camera control devices, such as the pan, tilt, zoom, focus and iris motors.

In such systems the control signals for the zoom, focus, iris, pan and tilt etc. functions are encoded and inserted into a portion of the video signal known as the "back porch". The back porch is the portion of a television signal that lies between the trailing edge of a vertical synchronizing pulse and the trailing edge of the corresponding blanking pulse. The back porch is typically of a duration to include 15 to 20 horizontal lines that are not used to carry picture information. The vertical back porch immediately follows the 190 microsecond vertical synchronizing pulse and has a duration of approximately 900 microseconds.

Many different types of television systems, including broadcast and closed circuit systems, use the back porch area to carry information other than picture information. For example, many commercial broadcasters insert teletext, VIR signals or closed captioned signals for the hearing impaired into the 15 to 20 unused lines of the back porch. In the CCTV systems under discussion the inserted information is control signals for the various camera control mechanisms.

The camera control signals can be pulses encoded in any manner, for example, binary, BCD or a simple arithmetic counting of the pulses. In the simplest systems an arbitrary number of pulses, for example, four, will correspond to, for example, pan right, while five pulses could correspond to pan left. Any number of pulses can be assigned to any function within the constraints of the time and frequency limitations of the system to permit encoding of a variety of functions.

The performance of long distance installations is severely dependent upon the type and length of wire used to transmit the video and control signals. The distance over which a video or other signal can be transmitted on a cable is limited by the cable characteristics. Over long distances, the signal tends to deteriorate, since it becomes attenuated, particularly at higher frequencies. For example, transmission distances are limited to approximately 1500 feet when RG59U cable is used. This is insufficient in many installations.

In order to overcome the distance problem, in many CCTV installations intermediate amplifiers are added to equalize and boost the signal so that it can be transmitted over a longer distance. In the single link systems described above, however, the use of such amplifiers heretofore has not been possible since known amplifiers are unidirectional devices. If an amplifier was used to amplify the signal received from the camera it would block all of the control signals since the control signals would be applied to the output of the amplifier. The control signals would stop at the amplifier and not be transmitted to the decoding receiver. Thus, in the known art, the use of intermediate amplifiers has been limited to multi-wire installations.

OBJECTS OF THE INVENTION

It is thus an object of the present invention to provide a system capable of bi-directionally transmitting video and control signals over a single link.

It is further an object of the invention to provide a system in which control signals from a video control console and a video signal from a video camera can be transmitted over long distances without significant deterioration of the video or control signals.

It is yet another object of this invention to provide for a simplified closed circuit television installation permitting the use of a single link such as a coaxial or twisted pair wire cable to transmit both control and video signals in opposing directions.

SUMMARY OF THE INVENTION

In a preferred, yet nonetheless illustrative embodiment, a bi-directional amplifier according to the present invention is electrically coupled between a control console and a receiver/camera by a single link. The bi-directional amplifier has a first terminal adapted to receive a signal from a video camera and to transmit control signals over the cable to the video camera and receiver during the video signal vertical back porch. Similarly, a second terminal is coupled to transmit the received video signal and to receive the control signals over the cable.

The invention includes an amplifier having an input terminal coupled to the first terminal for amplifying video signals and an output terminal coupled to a sample and hold circuit and a switch. A control signal generator controls both the switch and the sample and hold such that during the picture information portion of the video signal the amplifier is coupled so that it functions as a normal video amplifier to amplify and equalize the video signal received from the camera, and place it on the cable coupled to the control console monitor.

The D.C. level of the back porch portion of the video signal is measured and its value stored in the sample and hold. The video amplifier is then disconnected from the output. During the vertical back porch a buffer is used to couple the control signals from the control console to the camera.

DESCRIPTION OF THE PREFERRED EMBODIMENTS

Figure 1:
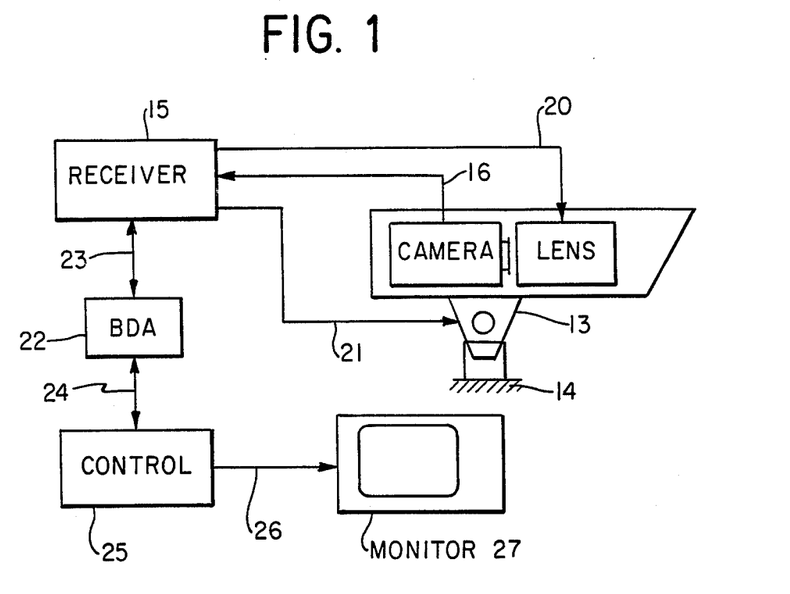
FIG. 1 is a block diagram showing use of the present invention in a closed circuit television system.

Referring now to FIG. 1, a camera 10 and lens 11 are mounted in camera housing 12. Housing 12 is mounted on pan and tilt mechanism 13 which may be supported on a pole or other stable mounting surface.

Camera 10 provides a video television signal, including picture information and necessary synchronization pulses to receiver 15 via lead 16. Receiver 15 provides control signals to the lens 11 via lead 20 and to the pan and tilt mechanism via lead 21. Lens 11 may include zoom, focus and iris mechanisms which can be electrically controlled by control signals transmitted over lead 20. Pan and tilt mechanism 13 can be electrically controlled by the signals received from lead 21 to control left and right panning of the camera and tilting of the camera up or down.

Bi-directional amplifier 22 functions to send the control signals to receiver 15 over lead 23 and to receive signals from receiver 15 on lead 23. Lead 23 can be a single coaxial cable or, as will be described further hereinbelow, a twisted pair and is referred to hereinafter as a single link.

Bi-directional amplifier 22 is coupled over lead 24 to the control console 25. Lead 23 can be, for example, 5,000 feet of RG11U coaxial cable. Video signals from the camera 10 are transmitted back to the control console 25, and the control signals can be transmitted over lead 24 from control console 25 for control of the camera lens and pan and tilt mechanisms.

The video signals received from lead 24 are provided to monitor 27 on lead 26. The image shown on the monitor 27 may then be viewed by security or other personnel.

Figure 2:
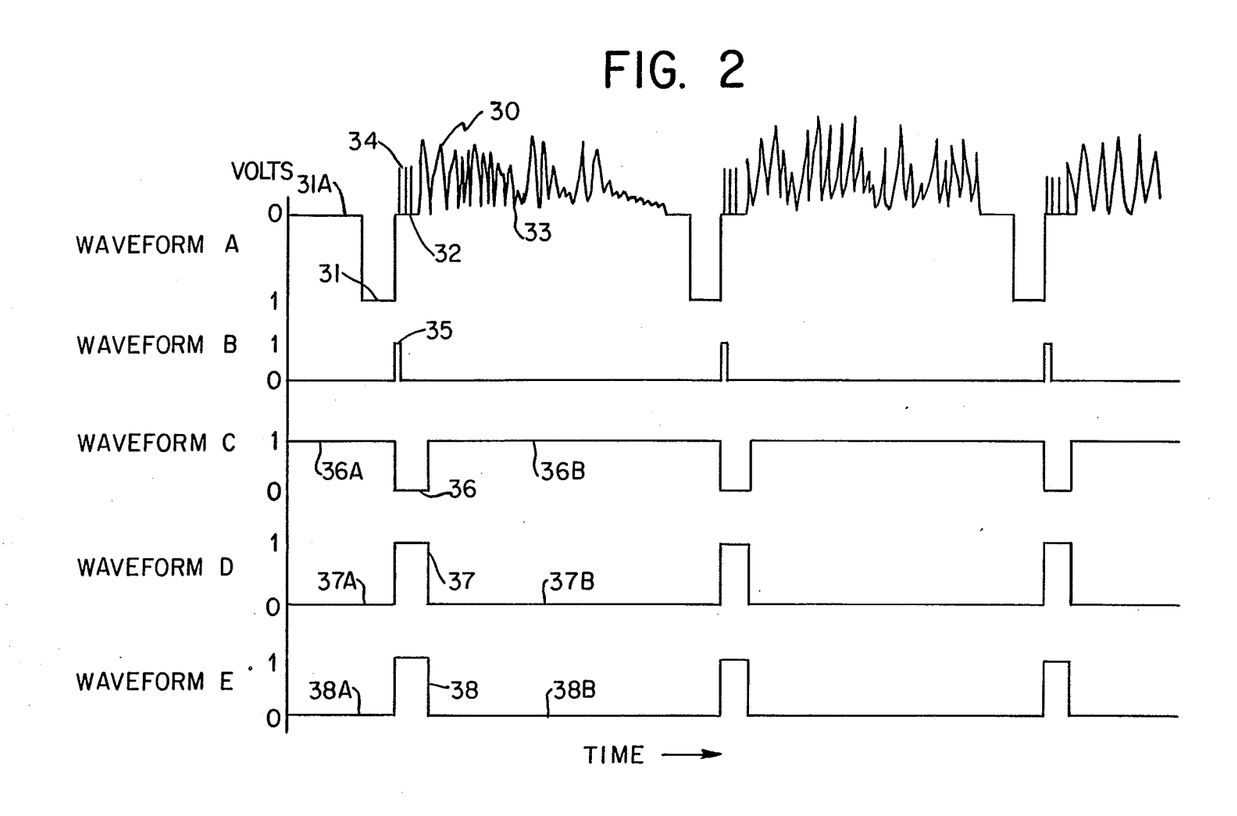
FIG. 2 shows voltage waveforms useful in explanation of the present invention.

As is known, a video signal shown in FIG. 2 waveform A, contains picture information 30 which when received by a video monitor is assembled into a series of frames. In the United States, a television signal includes 30 frames per second. Each frame is comprised of 2 fields. The fields of each frame include a raster of 262½ horizontally traced lines which sweep from left to right, starting in the upper left hand corner. The lines of two successive fields are vertically displaced to form an "interlaced" frame such that a line from the first frame will be immediately between two lines from the second frame. Thus each frame includes 525 lines, scanned in two groups of 262½.

Each horizontal line scans across a screen in approximately 63 microseconds, and includes a horizontal synchronization signal. The horizontal synchronization signal is a pulse present at the beginning of each scanned line and is used to synchronize the horizontal sweep of an electron beam across the monitor's CRT with a similar horizontal sweep across the imaging element of the video camera (for example, a vidicon tube). Since 525 lines must be swept across the CRT every 30 seconds, the horizontal synchronization pulse has a repetition rate of 15.75 khz. Each horizontal sweep also includes a horizontal retrace period, during which the electron beam returns to the left hand side of the screen, but is blanked, that is, it is prevented from writing on the screen by a horizontal blanking pulse.

Each horizontal line includes video information which is comprised of a signal varying between predetermined voltage levels. The lowest voltage level is shown as black on a monochrome television, and the highest voltage level is white. (Color television signals also include a color burst signal used to determine the colors of the line.) Each horizontal line further includes a 'back porch' portion that lies between the trailing edge of the horizontal pulses and the trailing edge of the corresponding blanking pulses.

In addition to the horizontal synchronizing pulses, each field has a vertical synchronizing pulse 31 which causes the raster of 262½ lines to start scanning at approximately the upper left hand corner of the CRT screen. This synchronizes each field with the scan of the field originating from the video camera. Since a vertical synchronization pulse is generated for each field, they have a repetition rate of 60 hz.

The vertical back porch is the period between the trailing edge of the vertical synchronization signal and the start of the video signal. This area, shown in FIG. 2 waveform A as region 32, has a duration of approximately 900 microseconds.

Typically, approximately 15 scanning lines are available during the period of the back porch signal. Picture information is usually not contained in these scanning lines, but they are often used to include other information such as video text (teletext), closed captioned information, VIR signals, and in the present invention, camera control signals.

In the present invention, and as known in the art, the control signals to the camera and lens are encoded into the back porch region for reception and decoding by receiver 15. The signals can be encoded using various encoding techniques such as binary or BCD encoding. In the simplest embodiment, however, encoding is such that the number of pulses 34 appearing in the back porch corresponds to a desired function. Thus, for example, the control signal to make the lens zoom in could consist of one pulse, the signal to zoom out could consist of two pulses, pan right could be three pulses, pan left four pulses, etc. In theory there is no limitation upon the number of control pulses that can be placed within this back porch area as long as the frequency and time constraints of the system and back porch are respectively observed. In practice and in conventional systems approximately four horizontal lines (approximately 250 microseconds) can be devoted to such control signals.

When receiver 15 receives these control signals it decodes the signals using conventional techniques appropriate to the camera lens and pan and tilt mechanisms used to vary the attitude, focusing etc. of the camera assembly. Receiver 15 is mounted on or very near to camera 11 and thus the receiver's control signals can be coupled by individual dedicated lines directly to the various camera control mechanisms.

Figure 3:
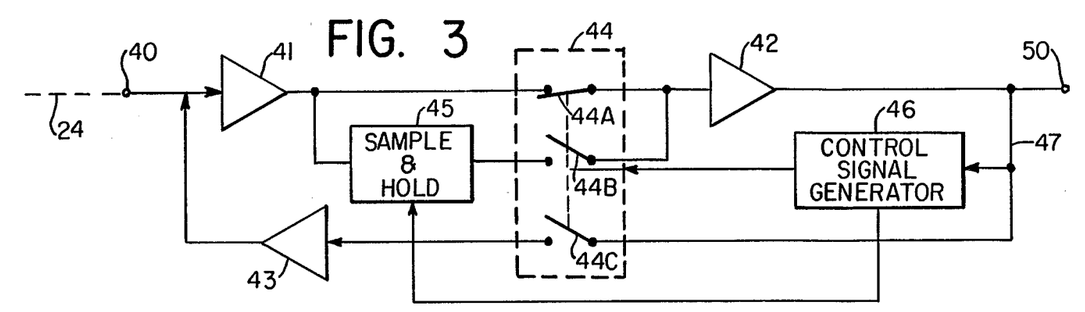
FIG. 3 is a block diagram of the present invention.

FIG. 3 shows bi-directional amplifier 22 in greater detail. The video signals are received from lead 24 at terminal 40 and then applied to video amplifier 41. Amplifier 41 may have a variable gain that can be adjusted according to the requirements of the particular installation in which it is used. Video amplifier 41 may also include low and high frequency compensation as needed to compensate for frequency dependent signal attenuation that occurs over a long cable run before the bi-directional amplifier 22 and a similar long cable run that occurs after bi-directional amplifier 22.

Bi-directional amplifier 22 further includes buffers 42 and 43, analog switch 44, sample hold 45 and control signal generator 46. Bi-directional amplifier 22 permits the transmission of information in both directions on leads 23 and 24 as well as maintaining buffering and 75 ohm input and output loads.

In operation, a signal from video amplifier 41 (which has been received from a remotely mounted CCTV camera) is applied to switch 44. Analog switch 44 can be a transmission gate such as the 4066 analog transmission gates manufactured by RCA Corporation, Somerville, N.J. and others. Other electronically controlled switches such as, for example, a relay could be used, provided it has the necessary bandwidth, response time and provides clean switching action for the video signals involved. In practice, these characteristics will be found in a solid state switch such as the aforementioned analog transmission gate. Solid state analog transmission gates, such as the 4066, generally include several separate switching paths on a single integrated circuit. In the present invention four such switching paths are needed and have been designated switches 44A, 44B and 44C. Waveforms C, D and E of FIG. 2 show the control signals generated by control signal generator 46 that are applied to switches 44A, 44B and 44C respectively. For purposes of explanation those switches are described as being closed at logical 1 and open at logical 0. It will be clear, however, to those skilled in the art that switches may be used that are open at logical 1 and closed at logical 0.

The signal received and amplified by amplifier 41 is coupled through switch path 44A to buffer 42 from which it is coupled to terminal 50 to lead 24 for reception ultimately by control console 25.

At a first time period 31A first video amplifier 41 is connected to receiver 15 for amplifying and equalizing the video picture signal and its output is coupled through transmission gate switch 44A to buffer 42. Switch path 44A is controlled by control signal generator 46 which provides a signal 35A shown in waveform C causing the transmission gate switch 44A to be closed.

When control signal generator 46 detects, via lead 47, a horizontal synchronization pulse, a sampling pulse 35 is generated at the trailing edge of the vertical sync pulse and applied to sample and hold 45 causing it to sample the d.c. voltage level present at the output of amplifier 41 before opening switch 44A. After the d.c. level has been sampled, switch 44A is opened and switch 44B and 44C are closed in response to a control signal 36 of waveform D and 37 of waveform E received from control signal generator 46. Sample and hold 45 thus holds the d.c. level (V) present on the video signal immediately prior to opening of switch 44A. This d.c. level is maintained at terminal 50 since the sample and hold output is coupled to buffer 42 through switch 44B which is now closed.

During the time switch 44B is closed and switch 44A is open, control signals from the control panel 25 may be sent via terminal 50 through switch 44C which is also closed. Switches 44B and 44C remain closed at least long enough for all control signals to be sent and typically throughout the duration of the back porch. Referring again to FIG. 2, sample and hold 45 functions to maintain the d.c. level of the back porch upon which the control pulses 34 are referenced. For example, if the back porch is at voltage V as shown in FIG. 2, voltage level V will be maintained by sample and hold 45 via switch 44B.

At the end of the back porch the analog transmission gates to the initially described condition, that is, switch 44A is closed, and switches 44B and 44C are open as indicated by regions 36A and 37A. This decouples the voltage received from the sample and hold 45 and permits undisturbed passage of the signal from video amplifier 41 to buffer 42 for transmission back to the control panel.

Therefore, during those periods of the video signal during which it is desired to view the scene being received by the video camera, transmission of signals takes place via video amplifier 42 to terminal 50 which is coupled to the control panel 25 which is in turn coupled to the monitor 27. During the back porch period, control signals are transferred via lead 47 to switch 44C which is now closed (see region 37C), to buffer 42 and in turn coupled to terminal 40 which is coupled to receiver 15 which in turn decodes the signals for application to the camera, pan and tilt mechanisms etc., in the conventional manner.

Figure 4A:
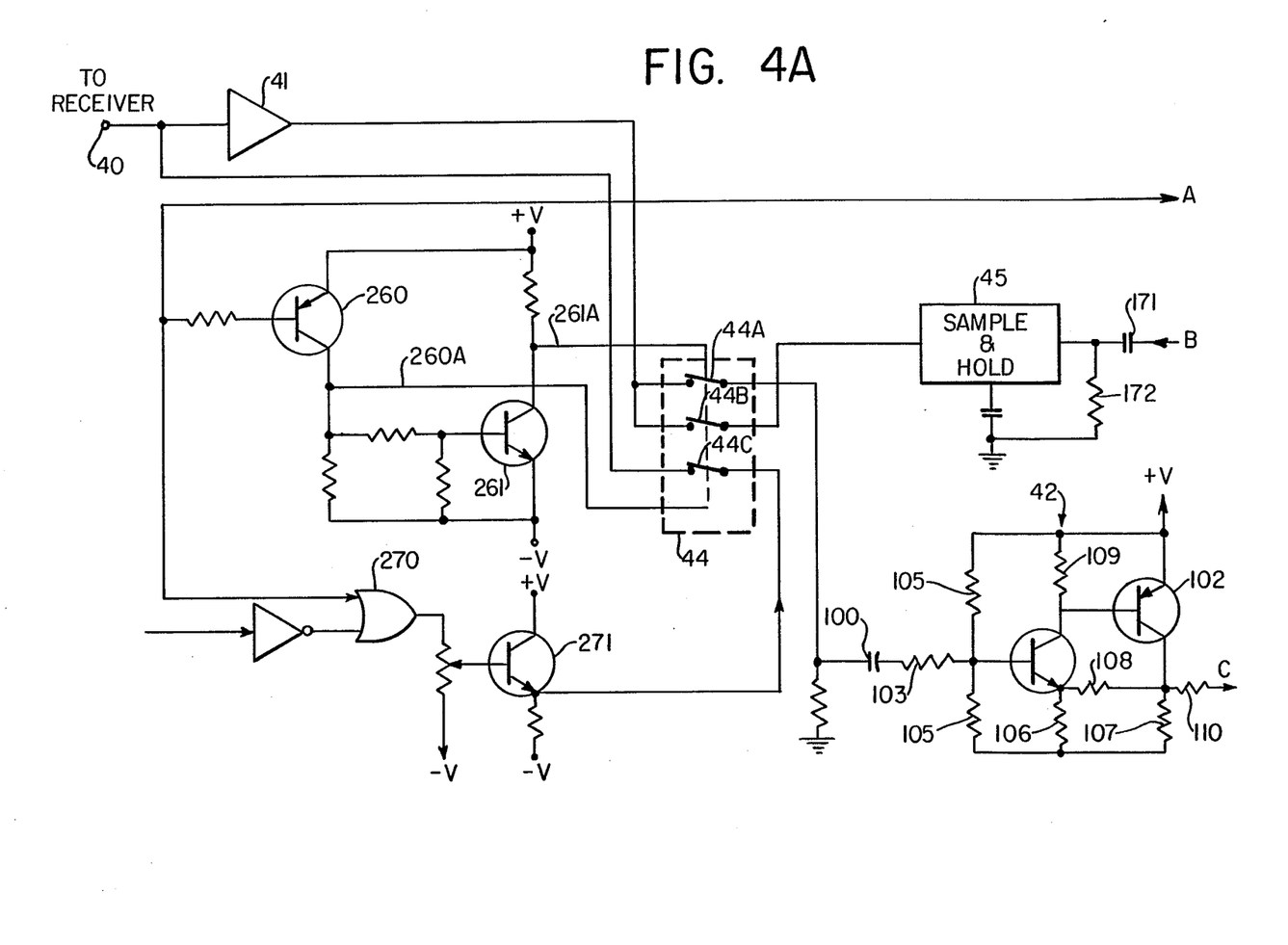
FIGS. 4A, 4B and 4C comprise a schematic showing a control signal generator useful in the present invention.
Figure 4B:
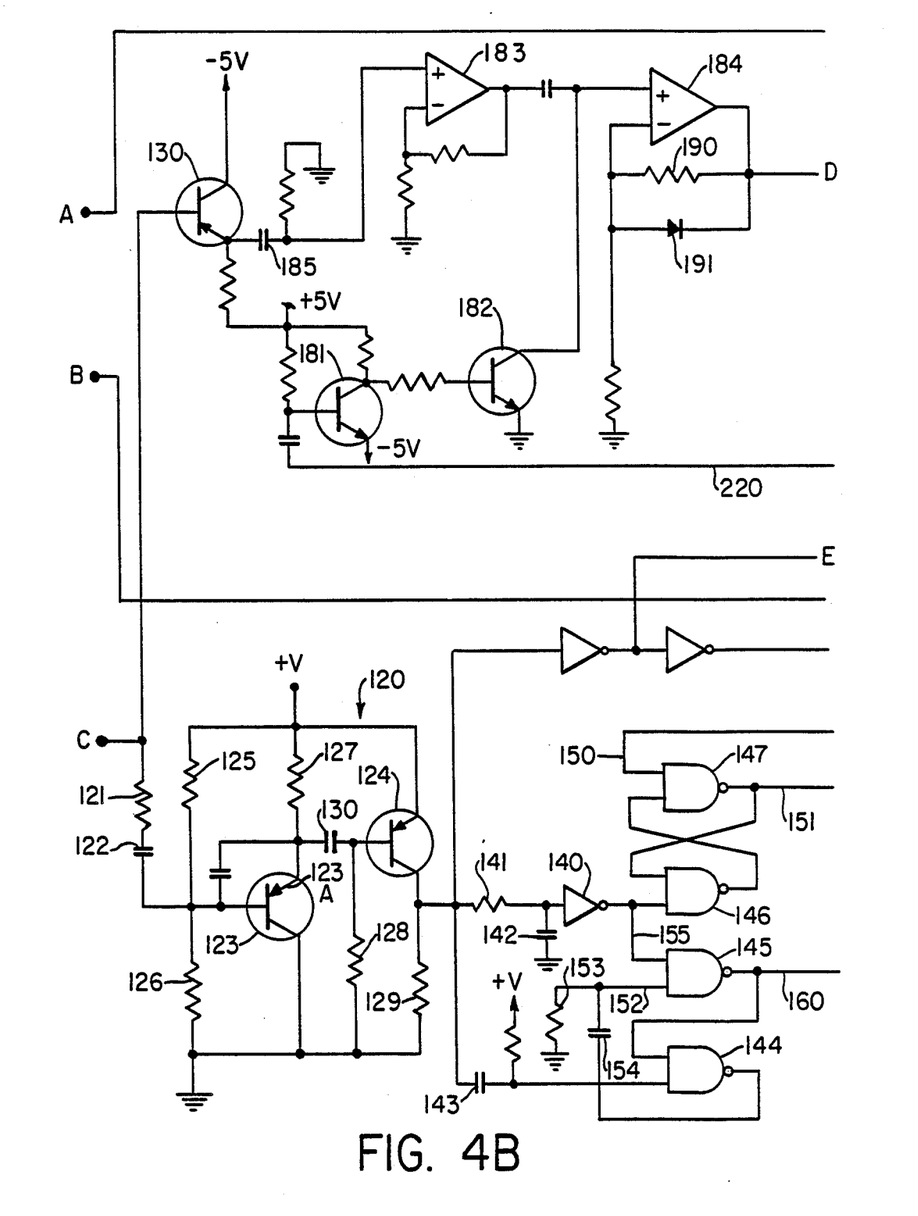

Refer now to FIGS. 4A and 4B in which control signal generator 46 is shown in greater detail.

A start pulse is generated by receiver 15 and received at terminal 40. The start pulse is associated with every field and has a repetition rate of 16.7 milliseconds. The start typically starts ten lines into the vertical back porch instead of at the beginning of a field. It is received together with the video signal from the camera and amplified by amplifier 41 and applied from there to analog transmission gate 44.

At power on switch 44A is held in a closed or conducting position and switches 44B and 44C are in an open position. The video signal from amplifier 41 is capacitively coupled to amplifier 42 via capacitor 100. Amplifier 42 is in turn comprised of transistors 101 and 102, which are the active elements, and resistors 103-110, which establish the bias and other operating conditions for amplifier 42. The output of amplifier 42 is coupled to terminal C and in turn applied to sync separator 120 and the base of transistor 130. Sync separator 120 separates out the synchronization signals supplied with the video signal from receiver 15.

The amplified video signal from amplifier 42 is coupled via a RC network comprised of resistor 121 and capacitor 12. Transistor 123 together with resistors 125, 126, and 127 serves as a buffer. Transistor 124 is used as a high gain switch. Transistor 124 is in a bias condition between on and off conditions which are controlled by resistors 128 and 129. AC coupling the output from transistor 123 to the base of transistor 124 will cause the output of transistor 124 to be "O" for any signal that is positive (video) and "1" for any signal that is negative (sync).

These signals are again inverted by invertor 140 to again become negative going pulses. Resistor 141, together with capacitor 142 act as a low pass filter which passes the vertical pulses having an approximate frequency of 60 cycles per second but not passing the higher horizontal synchronization pulses. The horizontal synchronization pulses are, however, coupled through capacitor 143 to NAND gate 144. The inverted vertical pulses are in turn coupled to NAND gates 145 and 146. NAND gate 147 together with NAND gate 146 forms an RS flip-flop which is reset by the signal applied on lead 150 as will be described further. A pulse corresponding in frequency and phase to the vertical sync is thus present on lead 151.

Input terminal 152 of NAND gate 145 is pulled down to 0 volts by resistor 153 which is in turn coupled to ground. NAND gate 145, however, also receives the vertical sync pulses on lead 155. Thus whenever it receives a vertical pulse as long as its input at 152 is held to ground that vertical pulse is not passed. NAND gate 144 receives the horizontal and vertical pulses via capacitor 143; another input to NAND gate 144 is taken from the output of NAND gate 145. This circuit provides a horizontal sync pulse. When NAND gate 144 is driven on it charges capacitor 154 to generate a short duration pulse determined by the RC constant of capacitor 154 and resistor 153, which is applied to NAND gate 145 and thus during the periods between vertical sync pulses, provides the horizontal sync pulse on lead 160.

Counter 161 is clocked by the horizontal sync pulses received on its clock input. The vertical sync pulses are connected to its reset inputs. Counter 161 can be, for example, a 74C93 four bit binary counter. Outputs Qa and Qb are coupled to NAND gate 162. When both Qa and Qb are driven high the NAND gate 162 output on lead 163 is driven low. The signal on 163 in turn resets the RS flip-flop formed by NAND gates 146 and 147. The net result is that counter 161 counts every horizontal pulse but is reset on every vertical pulse present on lead 151. this circuit thus provides out put signals on leads 170 and 180 as described below.

The output on lead 170 is applied to terminal B where it is in turn coupled to sample and hold 45. Capacitor 171 and resistor 172 act as a differentiator which provides very short pulses to sample and hold 45. This pulse, as was previously described, turns on sample and hold 45 so that it can sample the d.c. level at the back porch and hold this level for future reference. This held value is then maintained at the input to the control console when transmission of the video signal to the monitor is interrupted to permit transmission during what is ordinarily the back porch of the control signals from the console to the receiver. This maintains the proper d.c. level of the back porch to provide proper transmission of picture information and to permit operation as a true bi-directional amplifier.

The vertical sync pulse on lead 151 is also, however, applied via lead 180 to the clear (CLR) input of D-type flip-flop 210, which is thus cleared on every vertical sync pulse as described in further detail below.

The video information present at terminal C is also coupled to transistor 130 which together with transistors 181, 182 and operational amplifiers 183 and 184 and their associated capacitors and resistors function as an amplifier and level detector. This circuitry is used to detect control signals received from the control panel and detects the control signals which as shown for example in FIG. 2A are above the 0 volts level. Transistor 130 an input buffer the output signal of which is coupled from its emitter via coupling capacitor 185 to operational amplifier 183 which is a simple non-inverting amplifier.

Operational amplifier 184 includes in its feedback path resistor 190 in parallel with diode 191. Ignoring the effect of diode 191 for the moment, operational amplifier 184 is so arranged with resistor 190 to operate as a non-inverting amplifier having some negative feedback applied via resistor 190. As is well known the larger the signal applied to the inverting input of an operational amplifier the more feedback that is applied and the smaller the output signal. Since diode 191 is a unidirectional device, when positive signals appear at the output of operational amplifier 184, diode 191 is reverse biased and behaves as though it were an open circuit and does not effect the feedback loop. Negative signals at the output of operational amplifier 184 however are treated differently since all signals above approximately 0.6 volts are conducted through the diode which now acts as a very low resistance. Accordingly a very large signal is applied to the inverting input of operational amplifier 184 and consequently there is a very high degree of feedback. The result is that the output from the operational amplifier 184 applied to the C input of the flip-flop 210 is clamped to 0 volts for negative inputs while positive inputs will be permitted to be amplified in a normal manner.

As discussed previously the control signals have values which are positive with respect to ground. Thus the control signals are applied to the clock input of D-type flip-flop 210.

Transistors 181 and 182 function as very fast switches. Transistor 181 is capacitively coupled to lead 220. The signal on lead 220, which is described in further detail below, functions to turn on transistor 181 which in turn turns on transistor 182, and forces the signal at the inverting input of operational amplifier 184 to 0 volts since it is now shunted to ground through transistor 182. The signal on lead 220 occurs at every horizontal pulse and thus has the effect of clamping the input to operational amplifier 184 to 0 volts. This has the effect of maintaining d.c. restoration in the amplified signal transmitted to the control console.

As discussed above the output of operational amplifier 184 is coupled to the clocked input of D-type flip-flop 210. D-type flip-flop 210 operates so that the value at the input is clocked to its Q output at the trailing edge of the clocked input at input C. This signal is in turn coupled to the clocked input of D-type flip-flop 212 which in turn also acts to transfer the signal at its D input to its Q output when it receives the clocked signal.

D-type flip-flops 210 and 212 are positive edge clocked D-type flip-flops such as 74174's. The signal presented to the D input of a D-type flip-flop goes on to the Q output whenever the clock input changes from a low to a high level. The only time the output can change is when the clock goes positive; changes on the D input are not passed on the if the flip-flop is not clocked. When the clear (CLR) input of such flip-flops are tied to the positive voltage supply normal operation of the flip-flop is permitted. If however, the clear input is grounded the flip-flop immediately goes into a state where the Q output goes low.

As shown in FIG. 4b, the D inputs of both flip-flop 210 and 212 are held high. Since the clock input receives a pulse at every control signal pulse and further since the D input is held high, ordinarily the Q output of flip-flops 210 and 212 is high, unless a grounded signal is received at the CLR inputs. A signal corresponding to the vertical sync signal is present on lead 180 and coupled to the CLR inputs. When this signal goes low it clears flip-flop 210 and also clears flip-flop 212 via diode 215.

Flip-flop 212 is also cleared when transistor 216 is turned on by a positive signal at its base. Since diode 215 is reversed biased with respect to a positive going signal, such a signal does not affect flip-flop 210.

Flip-flops 210 and 212 thus are reset when the vertical sync pulses are detected and the start pulse is applied to the input of serial shift register 214.

Shift register 214 has a serial input and parallel outputs. It functions as a counter plus decoder but does not start until it receives the start pulse from flip-flop 212.

Shift register 214 can be of a type such as a 74164 which is an eight bit serial shift register having eight parallel output terminals $Q_a$–$Q_h$. Since the input remains high at the receipt of the start pulse, pulses are clocked through the output registers $Q_a$ through $Q_h$ upon each clock pulse received at the clock (CLK) input. As described previously, the signals received at the clock input correspond to the horizontal sync pulses.

A feedback loop is provided so that one "1" is generated at the input A of shift register 214. The $Q_a$ output is connected to the base of transistor 216. Transistor 216 is an NPN transistor; thus when a signal at its base goes high the transistor is forward biased and the clear input of flip-flop 212 is coupled to ground through transistor 216. This brings the Q output of D-type flip-flop 212 to ground and the input to the shift register at 214 to ground. Thus the next clock pulse received at the clock input is a 0. The 0 is then clocked into the shift register and the 1 that was originally at the $Q_a$ output is moved to the $Q_b$ output. When the 0 is present at the $Q_a$ output it causes transistor 216 to be turned off permitting D-type flip-flop 212 to go into the non-cleared state.

OR gates 220 and 221 operate to maintain the d.c. restoration of the video signal. Whenever a 1 is present at any of the inputs to OR gate 220, a 1 is presented at its output. Due to the alternating nature of the 1's and 0's clocked through shift register 214 after initialization a 1 is almost always present at the inputs of OR gate 220 and thus its output will remain high. Its output in turn is presented to OR gate 221, together with the horizontal and vertical sync pulses. The output of OR gate 221 is in turn coupled to transistor 181 which as described heretofore functions together with transistors 181 and 182 to short the signal at the inverting input of operational amplifier 184 to ground.

NOR gate 230 receives its input from the $Q_b$, $Q_c$ and $Q_e$ outputs of the shift register. The output of NOR gate 230 is 0 whenever there is a 1 input at any one of its three inputs since the output goes to 1 when there is a 0 input at all three of its inputs.

Figure 4C:
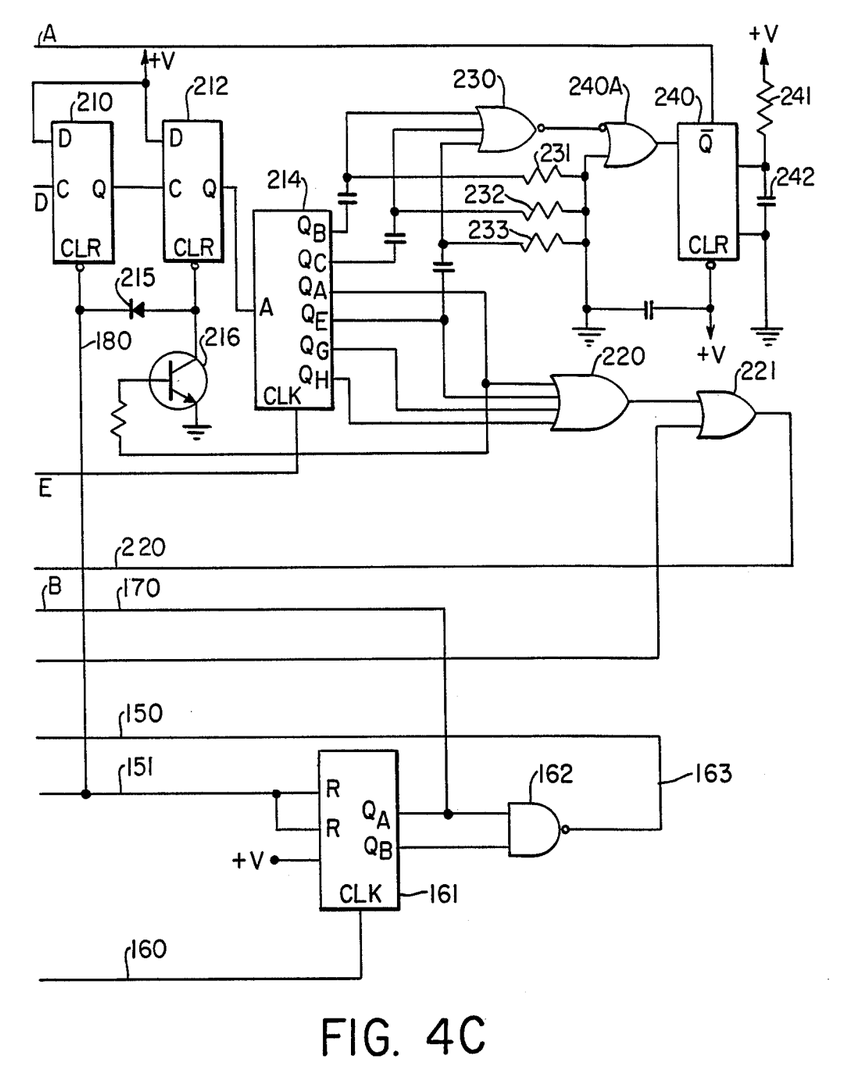

The inputs to NOR gate 230 are ordinarily held to ground via pull down resistors 231, 232, and 233. Whenever there is a transistion in the output at $Q_b$, $Q_c$ and $Q_e$ resulting from, for example, clocked input to shift register 214, there is, however, a brief pulse presented to NOR gate 230 and output of NOR gate 230 goes to zero. The duration of the pulse depends upon the value of the coupling capacitors, which are typically small and in the range of 1000 picofarads. These small coupling capacitors, together with a moderately low value for resisters 231, 232, and 233 (for example 10k ohms) provides a short pulse on the order of 10 microseconds to the inverted input of NOR gate 240a.

NOR gate 240A together with retriggerable monostable 240 typically come packaged as a single integrated circuit such as a 4528 dual retriggerable monostable. The dual retriggerable monostable is triggered by the 10 microsecond trigger pulse at its inverting input upon every horizontal pulse when there is a control pulse present and only after the receipt of the initial start pulse. The retriggerable monostable's output pulse period is set by resistor 241 and capacitor 242 to have a slightly less than the period for one horizontal line to be scanned across the CRT (approximately 63.5 microseconds). This signal is in turn coupled to transistors 260 and 261 with buffering and inversion so that the signal on lead 260 at the collector of transistor 260 is the inverse of the signal at the collector of transistor 261 on lead 261A. This thus provides the proper operation of switches 44A, 44B and 44C respectively as previously described.

This signal is also applied to NOR gate 270 together with a signal from operational amplifier 184 to transistor 271 and coupled through switch 44C. The resulting signal corresponds to the control signals received after the start pulse which can then be coupled back to the camera receiver mounted at the camera when switch 44C is in a closed condition.

The foregoing description of the circuitry describes a specific embodiment which generates the necessary control signals for sample and hold 45 and analog transmission gate 44 switches 44A, 44B and 44C. It will be clear to those skilled in the art, however, that any suitable control and logic circuitry can be utilized to generate a signal, particularly as required by the specifics of the encoded control signals utilized by the camera/receiver and the console.

Figure 5:
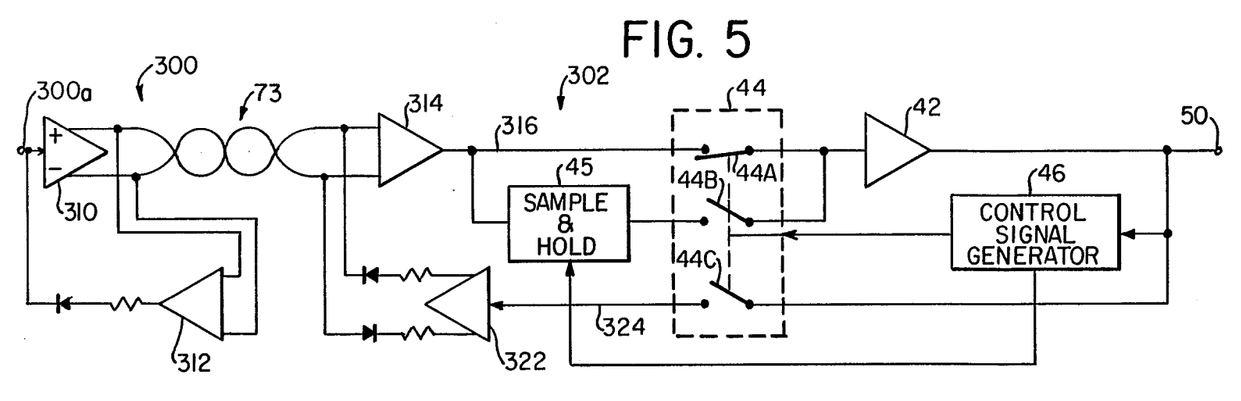
FIG. 5 is an alternative embodiment of the present invention adapted for use with a twisted pair.

Turning now to FIG. 5 a variation of the circuitry of FIG. 3 is shown adapted for use with non-coaxial cable such as standard twisted pair of wires. The circuitry of FIG. 5 functions in a similar manner to that described in FIG. 3 but contains additional circuitry to permit the use of balanced lines, while the circuitry of FIG. 3 is adapted for use with an unbalanced configuration. Since the operation of FIG. 5 is similar to that of the circuit of FIG. 3 like circuit elements in FIG. 5 will be referred to with the same element numbers as used in FIG. 3.

The embodiment of FIG. 5 includes a first circuit block 300 and a second circuit block 302. Circuit block 302 corresponds to the circuitry of FIG. 3 while circuit block 300 provides new circuitry for adapting to the conversion between balanced and unbalanced operation. Circuit block 300 uses balanced and differential amplifiers to convert between balanced and unbalanced operation.

Circuit block 300 includes a balanced line driver 310 and a differential amplifier 312 and is used in conjunction with a second circuit block 302 for adapting the bi-directional amplifier of FIG. 3 for use with a twisted pair. Circuit block 302 is essentially the same as that shown in FIG. 3 but includes a differential amplifier 314 for converting the balanced transmission from the twisted pair to an unbalanced output on lead 316.

In the initial step the output of differential amplifier 314 is coupled via analog transmission gate 44, switch 44A, to buffer 42. The video signals from the camera are then applied to terminal 320 which is coupled to the output of buffer 42.

Control signal generator 46 operates as described previously to detect the control signals from the control panel which are coupled to terminal 320. When control signal generator 46 detects the control pulses it sends a sampling pulse to the sample and hold 45 which samples the D.C. level at the output of amplifier 314 on lead 316. As previously described this corresponds to the D.C. level of the back porch of the video signal previously shown and described with respect to FIG. 2.

The control signal generator then opens switch 44A and closes switch 44B to maintain the same D.C. level at the input of buffer 42 that was present prior to the opening of switch 44A. The control signal generator then detects the control signal from terminal 320 to reconstruct the control signal and feed it to the balanced line driver 322 via lead 324. Balanced line driver 322 converts the signals to a balanced signal which are then coupled back onto twisted pair 73.

In circuit block 300 differential amplifier 312 then receives the signal from twisted pair 73 converting it to an unbalanced signal and sending it to terminal 300A for use by various camera lens and attitude control mechanisms.

Operation of the circuit of FIG. 5 is therefore similar to that of the circuit of FIG. 3. The primary differences are that circuit block 300 is required for converting from a balanced to unbalanced configuration, and in circuit block 312 buffer amplifier 43 is replaced with a differential amplifier 322, and amplifier 41 is replaced with differential amplifier 314.

What is claimed is:

1. A bi-directional amplifier for use in a closed circuit T.V. system in which video signals from a camera and camera control signals from a control console are transmitted between said camera and said control console, said camera being mounted remotely from said console and coupled thereto by a single link, said video signal including a picture information portion and a vertical back porch, said control signals being placed on said single link during said vertical back porch of said video signal, said system further including a receiver for receiving said camera control signals and for generating signals for controlling said camera, said bi-directional amplifier comprising:

means for detecting a start pulse from said receiver associated with the start of said vertical back porch;

sample and hold means for detecting a d.c. level of said vertical back porch; and switch means comprising a first switch for transmitting said video signal from said camera to said control console during said picture information portion of said video signal and not transmitting said video signal from said camera during said back porch, second switch means for coupling the output of said sample hold to said control console during said vertical back porch of said video signal for maintaining said d.c. level and not coupling the output of said sample and hold to said control console during said picture information portion and third switch means for coupling said control signals to said camera during said vertical back porch and not coupling said control signals to said camera during said picture information portion.

2. The bi-directional amplifier according to claim 1 wherein said single link comprises a coaxial cable.

3. The bi-directional amplifier according to claim 2 further comprising a control signal generator coupled to said sample and hold means and to said first, second, and third switches for generating control signals controlling the operation thereof.

4. The bi-directional amplifier according to claim 3 wherein said control signal generator comprises:

means for turning said first switch on during the video signal portion of said picture information and for simultaneously opening said second and third switches, and further for disenabling said sample and hold;

said control generator means further including means for enabling said sample and hold to sample a D.C. level of back porch during an interval having no control signals present; and means for closing said second and third switches during said back porch.

5. The bi-directional amplifier according to claim 4 further comprising:

a first terminal for connection to a cable coupled to said camera receiver;

a second terminal for coupling to a cable coupled to said control panel;

a first amplifier having an input terminal coupled to said first terminal and an output terminal coupled to an input to said first switch means;

a second amplifier having an input terminal coupled to an output terminal of said first switch means and having an output terminal coupled to said second terminal means;

a third amplifier having an input terminal coupled to a terminal of said third switch means and an output terminal coupled to said first terminal;

wherein said third switch has an input terminal coupled to said second terminal means;

said second switch has an input terminal coupled to said input of said second amplifier and an output terminal coupled to a sampling input of said sample and hold; and said sample and hold has an output terminal coupled to the input terminal of said first switch means.

6. The bi-directional amplifier according to claim 5 wherein said first, second and third switch means comprise an analog transmission gate.

7. The bi-directional amplifier according to claim 6 wherein said first amplifier includes means for adjusting its gain;

said second amplifier includes compensation means for compensating for high and low frequency attenuation loss occuring over said coaxial cable prior thereto and said coaxial cable coupled thereafter.

8. The bi-directional amplifier according to claim 7 wherein said control generator means further comprises:
   means for detecting a start pulse from said receiver; and
   sync separator means for detecting said vertical and horizontal synchronization signals and for providing signals representative thereof.

9. The bi-directional amplifier according to claim 8 further comprising window means for providing an enable signal less than the length of one horizontal line and in synchronization with said control signals; and
   enabling means having a first input coupled to receive said window signal and a second input coupled to receive said control signal, said enabling means only passing said control signal when said enable signal is active.

10. The bi-directional amplifier according to claim 1 wherein said single link comprises twisted pair wires, and further comprises:
    first terminal for coupling to said camera;
    balanced line driver means having an input terminal coupled to said first terminal and balanced output terminals for coupling to a first end of said twisted pair; and
    converting means coupled to said twisted pair first end for converting a balanced input to an unbalanced output.

11. The bi-directional amplifier according to claim 10 wherein said converting means comprises a differential amplifier.

12. The bi-directional amplifier according to claim 11 further comprising a control signal generator coupled to said sample and hold means and to said first, second and third switches for generating control signals controlling the operation thereof.

13. The bi-directional amplifier according to claim 12 wherein said control signal generator comprises:
    means for turning said first switch on during the picture information portion of said video signal and for simultaneously opening said second and third switches, and further for disenabling said sample and hold;
    said control generator means further including means for enabling said sample and hold to sample a D.C. level of said back porch during an interval having no control signals present; and
    means for closing said second and third switches during said back porch period.

14. The bi-directional amplifier according to claim 13 further comprising:
    a first terminal for connection to a cable coupled to said camera receiver;
    a second terminal for coupling to a cable coupled to said control panel;
    a first amplifier having an input terminal coupled to said first terminal and an output terminal coupled to an input to said first switch means;
    a second amplifier having an input terminal coupled to an output terminal of said first switch means and having an output terminal coupled to said second terminal means;
    a third amplifier having an input terminal coupled to a terminal of said third switch means and an output terminal coupled to said first terminal;
    wherein said third switch has an input terminal coupled to said second terminal means;
    said second switch has an input terminal coupled to said input of said second amplifier and an output terminal coupled to a sampling input of said sample and hold; and
    said sample and hold has an output terminal coupled to the input terminal of said first switch means.

15. The bi-directional amplifier according to claim 14 wherein said first, second and third switch means comprise an analog transmission gate.

16. The bi-directional amplifier according to claim 15 wherein said first amplifier includes means for adjusting its gain;
    and said second amplifier includes compensation means for compensating for high and low frequency attenuation loss occurring over said twisted pair prior thereto and said twisted pair coupled thereafter.

17. The bi-directional amplifier according to claim 16 wherein said control generator means further comprises:
    means for detecting a start pulse from said camera/receiver; and
    sync separator means for detecting said vertical and horizontal synchronization signals and for providing signals representative thereof.

18. The bi-directional amplifier according to claim 17 further comprising window means for providing an enable signal less than the length of one horizontal line and in synchronization with said control signals; and
    enabling means having a first input coupled to receive said window signal and a second input coupled to receive said control signal, said enabling means only passing said control signal when said enable signal is active.

* * * * *